US008077168B2

(12) United States Patent
Shin

(10) Patent No.: US 8,077,168 B2
(45) Date of Patent: Dec. 13, 2011

(54) SCAN DRIVER FOR SELECTIVELY PERFORMING PROGRESSIVE SCANNING AND INTERLACED SCANNING AND A DISPLAY USING THE SAME

(75) Inventor: Dong-Yong Shin, Suwon-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 395 days.

(21) Appl. No.: 12/404,827

(22) Filed: Mar. 16, 2009

(65) Prior Publication Data

US 2009/0231311 A1 Sep. 17, 2009

Related U.S. Application Data

(62) Division of application No. 11/284,973, filed on Nov. 23, 2005, now abandoned.

(30) Foreign Application Priority Data

Nov. 26, 2004 (KR) ........................ 10-2004-0098255
Nov. 26, 2004 (KR) ........................ 10-2004-0098267

(51) Int. Cl.
*G06F 3/038* (2006.01)

(52) U.S. Cl. ........... 345/204; 345/82; 348/446; 348/448

(58) Field of Classification Search ................... 345/100
See application file for complete search history.

(56) References Cited

U.S. PATENT DOCUMENTS 4,868,657 A * 9/1989 Samuels ...................... 348/441
4,922,240 A * 5/1990 Duwaer ........................ 345/100
5,568,163 A 10/1996 Okumura
5,818,413 A * 10/1998 Hayashi et al. ............... 345/100
5,883,609 A 3/1999 Asada et al.
6,020,871 A 2/2000 Asada
6,392,629 B1 5/2002 Murakami et al.
6,784,864 B1 * 8/2004 Koyama et al. ................. 345/98
2002/0047822 A1 * 4/2002 Senda et al. .................... 345/90

(Continued)

FOREIGN PATENT DOCUMENTS

EP 0730258 A1 9/1996

(Continued)

OTHER PUBLICATIONS

Non-Final Office Action mailed Jan. 20, 2010 for co-pending U.S. Appl. No. 11/284,973.

(Continued)

*Primary Examiner* — Richard Hjerpe
*Assistant Examiner* — Dorothy Harris
(74) *Attorney, Agent, or Firm* — H.C. Park & Associates, PLC

(57) ABSTRACT

A scan driver that selectively performs progressive scanning and interlaced scanning and a display using the same. The scan driver includes a shift register having a plurality of flip-flops arranged in series, an odd line selection unit having a plurality of NAND gates, and an even line selection unit having a plurality of NAND gates. In response to an odd line control signal and an even line control signal input to the odd line selection unit and the even line selection unit, respectively, the scan driver performs progressive scanning or interlaced scanning. The scan driver may also include a mode selection unit to selectively perform progressive scanning or interlaced scanning in response to a mode selection signal.

17 Claims, 15 Drawing Sheets

U.S. PATENT DOCUMENTS

| | | | |
|---|---|---|---|
| 2002/0163493 | A1 | 11/2002 | Matsushima et al. |
| 2005/0046619 | A1 | 3/2005 | Senda et al. |

FOREIGN PATENT DOCUMENTS

| | | | | |
|---|---|---|---|---|
| JP | 02-253232 | | | 10/1990 |
| JP | 05-307166 | | | 11/1993 |
| JP | 06-095071 | | | 4/1994 |
| JP | 07199154 | A | * | 8/1995 |
| JP | 08-234702 | | | 9/1996 |
| JP | 08-234703 | | | 9/1996 |
| JP | 11-202838 | | | 7/1999 |
| JP | 2003-25589 | | | 9/2003 |

OTHER PUBLICATIONS

European Search Report dated Mar. 30, 2006.

European Search Report dated Aug. 28, 2006.

Non-Final Office Action dated Apr. 20, 2009 (from co-pending U.S. Appl. No. 11/284,973.

Non-Final Office Action dated Jun. 7, 2010 in U.S. Appl. No. 11/284,973.

Final Office Action of parent U.S. Appl. No. 11/284,973, dated Oct. 21, 2010.

* cited by examiner

| MODE \ SRk SRk+1 | 00 | 01 | 10 | 11 |
|---|---|---|---|---|
| 0 | 1 | 1 | 1 | 1 |
| 1 | 0 | 1 | 1 | 1 |

SCAN DRIVER FOR SELECTIVELY PERFORMING PROGRESSIVE SCANNING AND INTERLACED SCANNING AND A DISPLAY USING THE SAME

CROSS-REFERENCE TO RELATED APPLICATION

This application is a divisional of prior application Ser. No. 11/284,973, filed Nov. 23, 2005, which claims priority to and the benefit of Korean Patent Application No. 10-2004-0098255, filed Nov. 26, 2004, and Korean Patent Application No. 10-2004-0098267, filed Nov. 26, 2004, which are all hereby incorporated by reference for all purposes as if fully set forth herein.

BACKGROUND OF THE INVENTION

1. Field of the Invention

The present invention relates to a scan driver for a flat panel display (FPD), and more particularly, to a scan driver that may selectively perform progressive scanning and interlaced scanning.

2. Discussion of the Background

A scan driver is an indispensable circuit for a FPD. The scan driver is used to drive a plurality of pixels that are arranged in rows and columns. In order to drive the pixels, the scan driver enables a selected row of pixels to emit light or enables data to be input to selected pixels.

Generally, formation of one image frame requires a vertical synchronous signal, which defines an image frame display period, and a horizontal synchronous signal, which drives each of a plurality of pixel lines forming the image frame. While the horizontal synchronous signal is activated, image data is input to pixels arranged in a line to which the horizontal synchronous signal is transmitted.

In a passive matrix (PM) display, pixels start to emit light when image data is input; however, in an active matrix (AM) display, after storing input image data, all pixels arranged in one line emit light during a predetermined time duration.

In a liquid crystal display (LCD), an organic electroluminescent (EL) display, and a plasma display panel (PDP), the horizontal synchronous signal is typically referred to as a scan signal. Therefore, a signal that selects and activates lines will hereinafter be referred to as a scan signal.

A circuit that transmits the scan signal to a panel in which pixels are arranged is a scan driver. More specifically, the scan driver transmits the scan signal to respective lines of the panel. The selection and activation of lines via transmission of the scan signal may be performed according to a progressive scan method or an interlaced scan method.

In the progressive scan method, a scan signal is sequentially transmitted to the panel lines. That is, the scan signal is sequentially transmitted to each of a first line through a final line.

In the interlaced scan method, a frame is displayed through two processes. Specifically, in a first process, a scan signal is sequentially transmitted to odd-numbered lines during an odd field period corresponding to half of a frame period. In a second process, a scan signal is sequentially transmitted to even-numbered lines during an even field period corresponding to the remaining half of the frame period.

Accordingly, a conventional FPD utilizes either progressive scanning or interlaced scanning to display image data because the FPD does not include a scan driver that can selectively perform progressive scanning and interlaced scanning.

SUMMARY OF THE INVENTION

The present invention, therefore, provides a scan driver that can selectively perform progressive scanning and interlaced scanning.

The present invention also provides an organic EL display that can selectively perform progressive scanning and interlaced scanning.

The present invention also provides a scan driver that selectively performs progressive scanning and interlaced scanning using a mode selection unit.

Additional features of the invention will be set forth in the description which follows, and in part will be apparent from the description, or may be learned by practice of the invention.

The present invention discloses a scan driver that selectively performs progressive scanning and interlaced scanning and that includes a shift register for receiving a start pulse and a clock signal and outputting data at intervals of a cycle of the clock signal, an odd line selection unit for receiving an output signal of an odd-numbered flip-flop of the shift register and an odd line control signal and performing a logical operation on the received signals to generate an odd scan signal, and an even line selection unit for receiving an output signal of an even-numbered flip-flop of the shift register and an even line control signal and performing a logical operation on the received signals to generate an even scan signal.

The present invention also discloses a display including a pixel array having a plurality of pixels, a scan driver for transmitting a scan signal and an emission control signal to the pixel array and selectively performing progressive scanning and interlaced scanning, and a data driver for transmitting data to a pixel selected by the scan signal of the scan driver. The scan driver includes a shift register for receiving a start pulse and a clock signal and outputting data at intervals of a cycle of the clock signal, an odd line selection unit for receiving an output signal of an odd-numbered flip-flop of the shift register and an odd line control signal and performing a logical operation on the received signals to generate an odd scan signal, and an even line selection unit for receiving an output signal of an even-numbered flip-flop of the shift register and an even line control signal and performing a logical operation on the received signals to generate an even scan signal.

The present invention also discloses a scan driver that selectively performs progressive scanning and interlaced scanning and that includes a shift register for receiving a start pulse and a clock signal and outputting data at intervals of half of a cycle of the clock signal, a mode selection unit for receiving an output signal of a flip-flop of the shift register and performing a logical operation on the output signal of the flip-flop in response to a mode selection signal, an odd line selection unit for selecting an output signal of an odd-numbered flip-flop or an output signal of the mode selection unit in response to an odd line control signal, and an even line selection unit for selecting an output signal of an even-numbered flip-flop or the output signal of the mode selection unit in response to an even line control signal.

The present invention also discloses a scan driver that selectively performs progressive scanning and interlaced scanning and that includes a shift register including a plurality of flip-flops connected in series, wherein odd-numbered flip-flops sample an input signal and output the sampled signal on a rising edge of a clock signal and even-numbered flip-flops sample an input signal and output the sampled signal on a falling edge of the clock signal, a mode selection unit for performing a logical OR operation on output signals of adjacent flip-flops or masking the output signals of the flip-flops in response to a mode selection signal, an odd line selection unit for selecting an output signal of an odd-numbered flip-flop or an output signal of the mode selection unit in response to an odd line control signal, and an even line selection unit for selecting an output signal of an even-numbered flip-flop or the output signal of the mode selection unit in response to an even line control signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
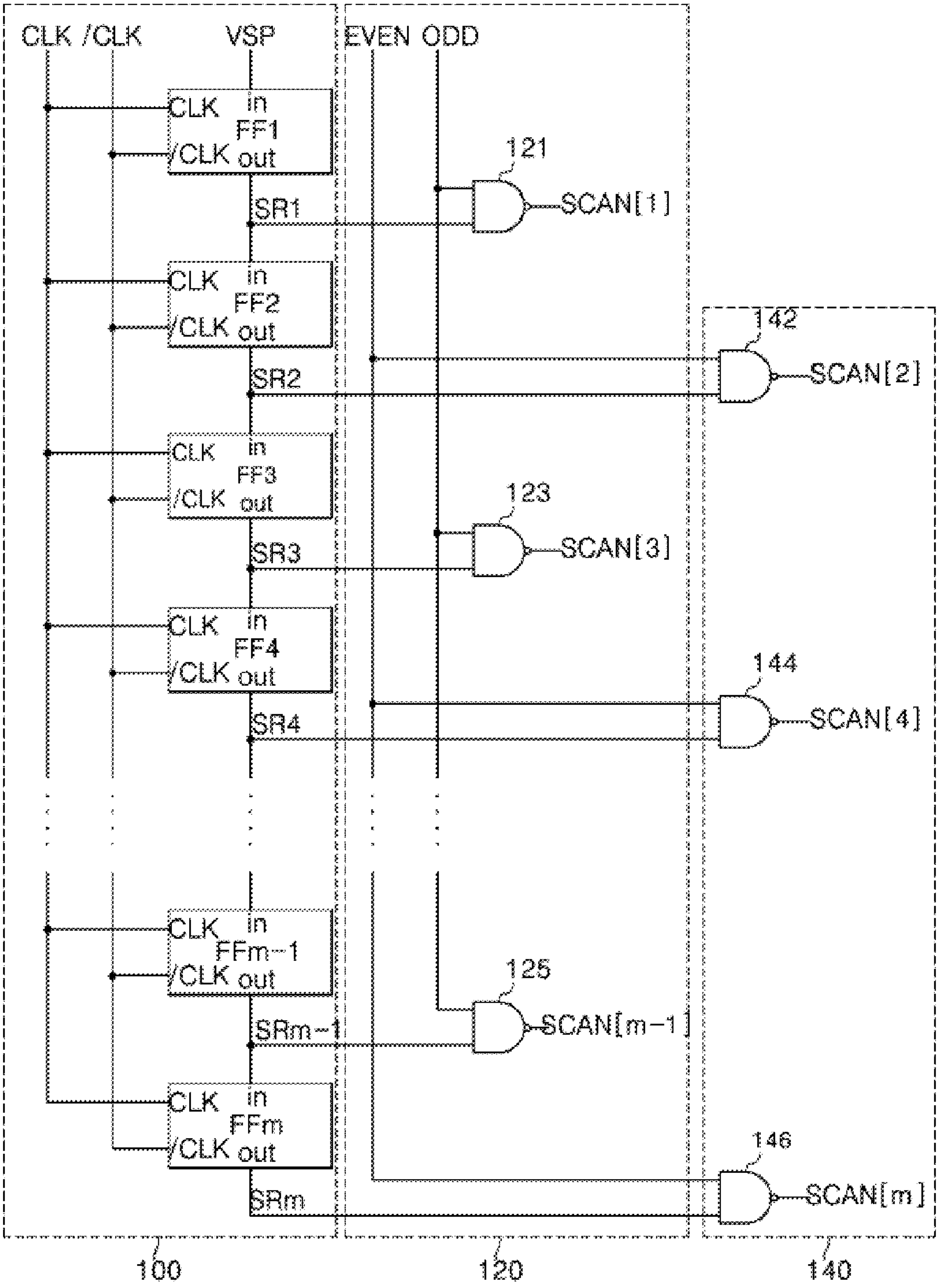
FIG. 1 is a circuit diagram of a scan driver that performs progressive scanning and interlaced scanning according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

FIG. 1 is a circuit diagram of a scan driver that selectively performs progressive scanning and interlaced scanning according to an exemplary embodiment of the present invention.

Referring to FIG. 1, the scan driver includes a shift register 100, an odd line selection unit 120, and an even line selection unit 140.

The shift register 100 includes flip-flops corresponding to the number of scan lines of a panel. Accordingly, when a panel includes m scan lines, the shift register 100 includes at least m flip-flops. A clock signal CLK and an inverted clock signal /CLK are input to each flip-flop. Each flip-flop transmits stored data to the next flip-flop per a clock cycle in synchronization with the input clock signal CLK.

Accordingly, an output signal SR1 of data stored in a flip-flop FF1 through a start pulse VSP is delayed by one clock cycle and output as an output signal SR2 of a flip-flop FF2. That is, output signals SR1, SR2, SR3, . . . , and SRm of flip-flops FF1, FF2, FF3, . . . , and FFm are delayed by one clock cycle and output as delayed signals.

The odd line selection unit 120 includes a plurality of NAND gates. An odd line control signal ODD is input to the NAND gates of the odd line selection unit 120. Also, output signals SR1, SR3, . . . , and SRm−1 of odd-numbered flip-flops are input to the NAND gates of the odd line selection unit 120.

More specifically, a first NAND gate 121 receives the odd line control signal ODD and the output signal SR1 of the flip-flop FF1 and performs a logical operation on the received signals to generate a first scan signal SCAN[1]. Also, a third NAND gate 123 receives the odd line control signal ODD and the output signal SR3 of the flip-flop FF3 and performs a logical operation on the received signals to generate a third scan signal SCAN[3]. The first NAND gate 121 to an (m−1)th NAND gate 125 of the odd line selection unit 120 perform the same operation on the same principle as described above. Accordingly, as the odd line selection unit 120 operates to generate odd scan signals.

The even line selection unit 140 also includes a plurality of NAND gates. An even line control signal EVEN is input to the NAND gates of the even line selection unit 140. Also, output signals SR2, SR4, . . . , and SRm of even-numbered flip-flops are input to the NAND gates of the even line selection unit 140.

More specifically, a second NAND gate 142 receives the even line control signal EVEN and the output signal SR2 of the flip-flop FF2 and performs a logical operation on the received signals to generate a second scan signal SCAN[2]. Also, a fourth NAND gate 144 receives the even line control signal EVEN and the output signal SR4 of the flip-flop FF4 and performs a logical operation on the received signals to generate a fourth scan signal SCAN[4]. The second NAND gate 142 to an mth NAND gate 146 of the even line selection unit 140 perform the same operation on the same principle as described above.

When the scan driver performs progressive scanning, the odd line control signal ODD is at a high level, and the odd-numbered NAND gates invert input signals. Thus, the first scan signal SCAN[1] is an inverted signal of the output signal SR1 of the flip-flop FF1, the third scan signal SCAN[3] is an inverted signal of the output signal SR3 of the flip-flop FF3, and an (m−1)th scan signal SCAN[m−1] is an inverted signal of the output signal SRm−1 of the flip-flop FFm−1.

Additionally, during progressive scanning, the even line control signal EVEN is at a high level, and the even-numbered NAND gates invert input signals. Thus, the second scan signal SCAN[2] is an inverted signal of the output signal SR2 of the flip-flop FF2, the fourth scan signal SCAN[4] is an inverted signal of the output signal SR4 of the flip-flop FF4, and an mth scan signal SCAN[m] is an inverted signal of the output signal SRm of the flip-flop FFm.

Accordingly, the scan driver performs progressive scanning when both the odd line control signal ODD and the even line control signal EVEN are at a high level.

On the other hand, when the scan driver performs interlaced scanning, the odd line control signal ODD is at a high level during an odd field period corresponding to half of a frame period. Accordingly, the odd-numbered NAND gates invert input signals during the odd field period.

Further, the odd line control signal ODD is at a low level during an even field period corresponding to the other half of the frame period. Accordingly, the odd-numbered NAND gates perform a masking operation during the even field period, thereby outputting high-level signals irrespective of output signal levels of the odd-number flip-flops.

Furthermore, the even line control signal EVEN is at a low level during the odd field period when the scan driver performs interlaced scanning. Accordingly, the even-numbered NAND gates output high-level signals during the odd field period. On the other hand, the even line control signal EVEN is at a high level during the even field period. Accordingly, the even-numbered NAND gates invert input signals during the even field period.

Hence, when the scan driver of FIG. 1 performs progressive scanning, the odd line selection unit 120 and the even line selection unit 140 are activated. But when the scan driver performs interlaced scanning, only the odd line selection unit 120 is activated during the odd field period, and only the even line selection unit 140 is activated during the even field period.

Figure 2:
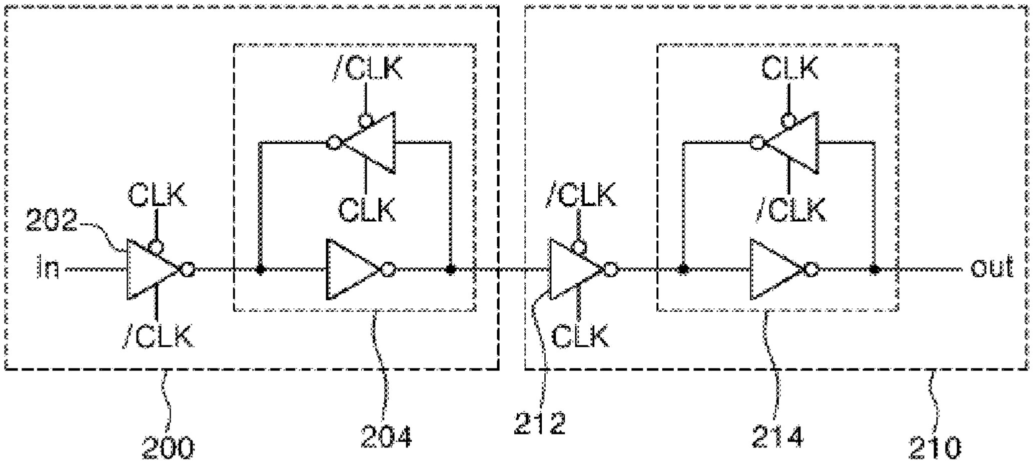
FIG. 2 is a circuit diagram of a flip-flop according to an exemplary embodiment of the present invention.

FIG. 2 is a circuit diagram of one of the flip-flops of FIG. 1.

Referring to FIG. 2, the flip-flop includes a first latch 200 and a second latch 210.

The first latch 200 includes a first sampler 202 and a first holder 204. The first sampler 202 samples an input signal in a low-level period of a clock signal CLK, and the first holder 204 holds an output signal of the first sampler 202 in a high-level period of the clock signal CLK. Hence, a signal, which is input to the first sampler 202 during a low-level period of the clock signal CLK, is held in the first holder 204 for a high-level period of the clock signal CLK. Since the input signal has a lower frequency than the frequency of the clock signal CLK, the first latch 200 samples the input signal during a low-level period of the clock signal CLK and holds the sampled input signal during a high-level period thereof.

The second latch 210 includes a second sampler 212 and a second holder 214. The second sampler 212 samples an input signal in a high-level period of the clock signal CLK, and the second holder 214 holds an output signal of the second sampler 212 in a low-level period of the clock signal CLK.

Operations of the flip-flop of FIG. 2 will now be described.

While the clock signal CLK is at a low level, the first sampler 202 receives an input signal, inverts the input signal, and outputs the inverted signal to the first holder 204. Since the first holder 204 operates at a high level, it does not hold the inverted signal during a low-level period of the clock signal CLK. Once the clock signal CLK makes a low-to-high transition, the first sampler 202 stops receiving the input signal, and the first holder 204 holds the inverted signal. Simultaneously, the second sampler 212 receives an input signal. An output signal of the first holder 204, which is input to the second sampler 212, is output via an inverter of the first holder 204. But while the clock signal CLK is at a high level, the second holder 214 does not hold received data, and while the clock signal CLK is at a low level again, the second holder 214 holds the received data.

Accordingly, the flip-flop of FIG. 2 stores data, which is input directly before a rising edge of the clock signal CLK, and outputs the data during one cycle of the clock signal CLK until a new sampling operation starts.

Figure 3:
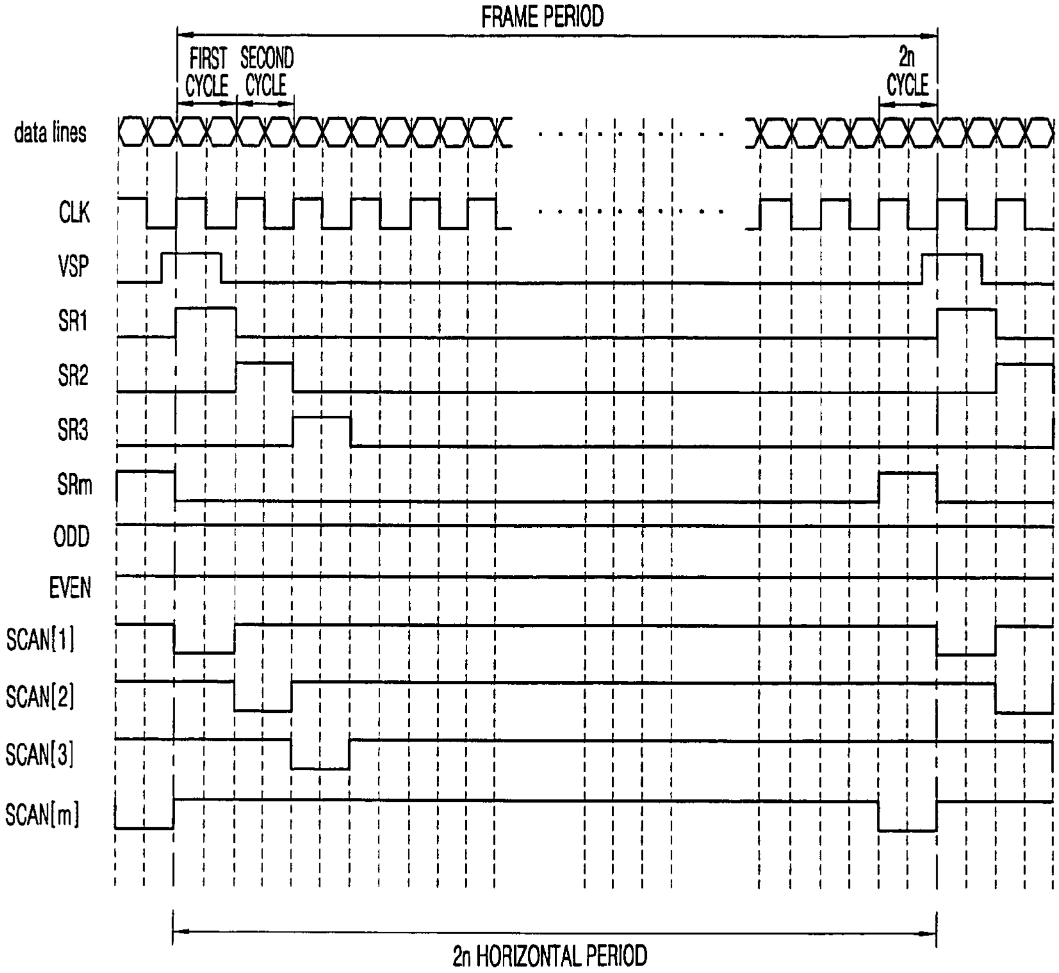
FIG. 3 is a timing diagram showing the progressive scanning of the scan driver of FIG. 1.

FIG. 3 is a timing diagram showing progressive scanning of the scan driver of FIG. 1.

The progressive scanning of the scan driver will now be described with reference to FIG. 1 and FIG. 3.

As described above with reference to FIG. 1, when the scan driver performs progressive scanning, as the NAND gates of the odd line selection unit 120 and of the even line selection unit 140 invert output signals of the flip-flops because the odd line control signal ODD and the even line control signal EVEN are at a high level.

At the outset, a start pulse VSP is input to the flip-flop FF1 with the same frequency as a frame frequency and during a low-level period of a clock signal CLK. The flip-flop FF1 samples the start pulse VSP before a rising edge of the clock signal CLK and outputs the sampled data. Thus, an output signal SR1 of the flip-flop FF1 is at a high level during a first cycle.

The output signal SR1 is input to the first NAND gate 121 and the flip-flop FF2. Since the odd line control signal ODD is at a high level, the first NAND gate 121 inverts the output signal SR1 and outputs the inverted signal. Thus, a first scan signal SCAN[1] is at a low level during the first cycle.

The output signal SR1 is also input to the flip-flop FF2, delayed by one cycle, and then output as a delayed signal. That is, data, which is sampled directly before a rising edge of a second cycle of the clock signal CLK, is output on the rising edge of the second cycle thereof. Accordingly, the flip-flop FF2 outputs an output signal SR2, which is delayed by one cycle as compared to the output signal SR1.

The output signal SR2 of the flip-flop FF2 is input to the second NAND gate 142 and the flip-flop FF3. Since the even line control signal EVEN is at a high level, the second NAND gate 142 inverts the output signal SR2 and outputs the inverted signal. Thus, a second scan signal SCAN[2] is at a low level during the second cycle.

Thereafter, the flip-flop FF3 receives the output signal SR2 and outputs an output signal SR3, which is delayed by one cycle as compared to the output signal SR2. The third NAND gate 123 receives and inverts the output signal SR3 and outputs a third scan signal SCAN[3], which is at a low level during a third cycle.

The above-described operation continues until the final flip-flop FFm outputs an output signal SRm and an mth scan signal SCAN[m] is generated.

In other words, with progressive scanning, all scan signals may be sequentially generated during one frame period as described above.

Figure 4A:
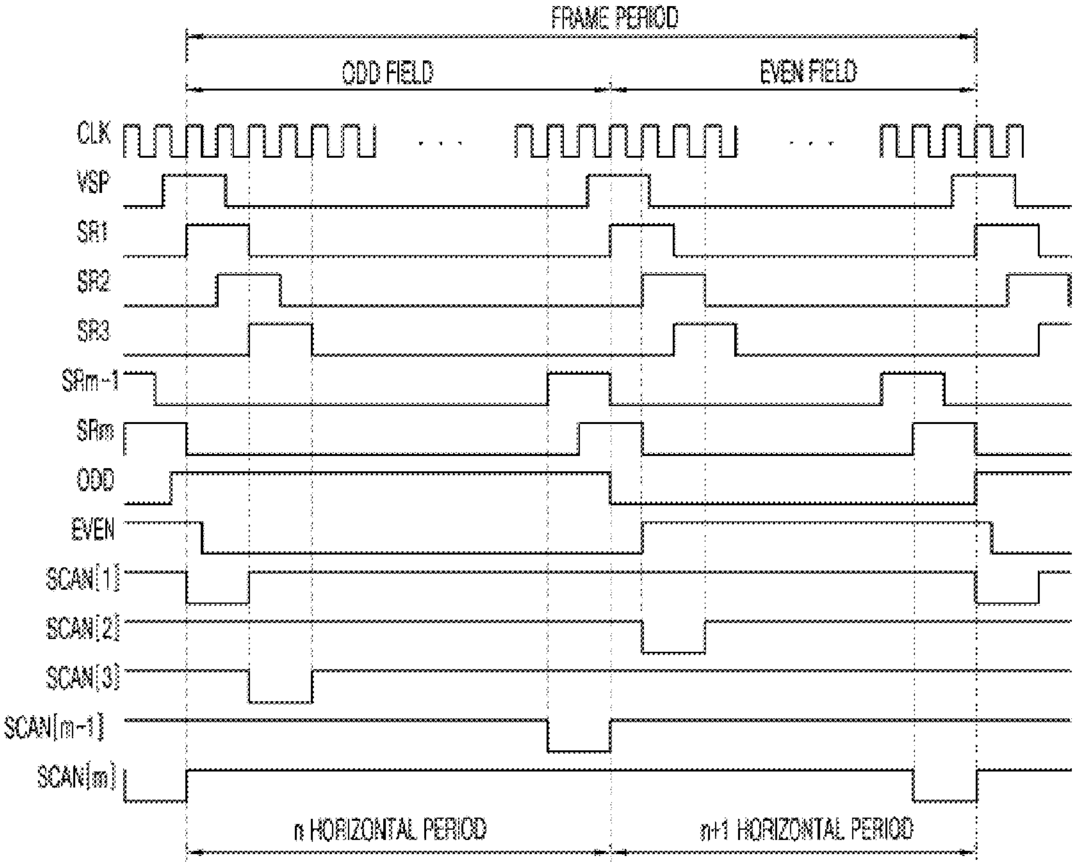
FIG. 4A and FIG. 4B are timing diagrams showing interlaced scanning of the scan driver of FIG. 1.
Figure 4B:
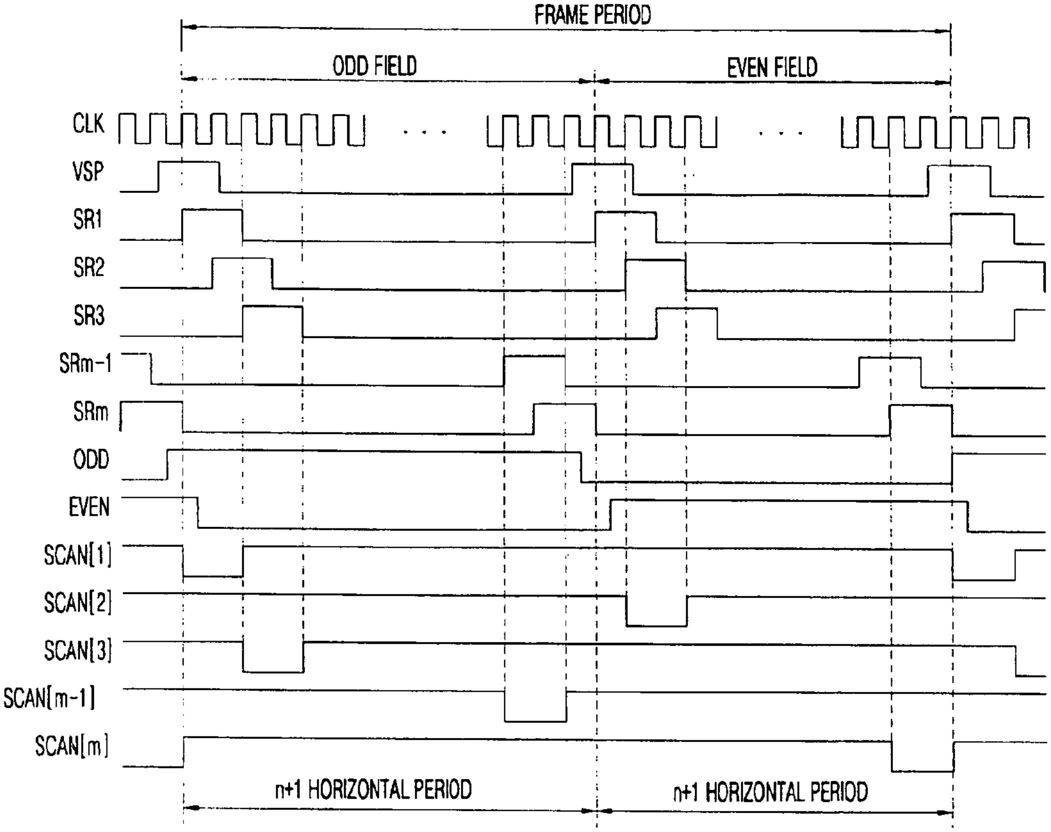

FIG. 4A and FIG. 4B are timing diagrams showing interlaced scanning of the scan driver of FIG. 1.

The interlaced scanning of the scan driver will now be described with reference to FIG. 4A and FIG. 1.

As described above with reference to FIG. 1, during interlaced scanning, one frame period is divided into an odd field period and an even field period. Odd scan signals SCAN[1, 3, . . . , m−1] are activated during the odd field period, while even scan signals SCAN[2, 4, . . . , m] are activated during the even field period.

The odd line control signal ODD is at a high level during the odd field period to generate the odd scan signals SCAN[1, 3, . . . , m−1]. Similarly, the even line control signal EVEN is at a high level during the even field period to generate the even scan signals SCAN[2, 4, . . . , m].

During the interlaced scanning of FIG. 4A, during the odd field period, which corresponds to about half of a frame period, output signals of odd-numbered flip-flops are inverted and output, and output signals of even-numbered flip-flops are masked. In order The odd line control signal ODD remains at a high level during the odd field period to invert the output signals of the odd-numbered flip-flops, and the even line control signal EVEN remains at a low level during the odd field period to mask the output signals of the even-numbered flip-flops.

On the other hand, during the even field period, which corresponds to the other half of the frame period, the output signals of the odd-numbered flip-flops are masked, and the output signals of the even-numbered flip-flops are inverted and output from the NAND gates of the even line selection unit 140. The odd line control signal ODD remains at a low level during the even field period to mask the output signals of the odd-numbered flip-flops, and the even line control signal EVEN remains at a high level during the even field period to invert the output signals of the even-numbered flip-flops.

At the outset, a start pulse VSP is input to the flip-flop FF1 with a frequency that is double the frame frequency. Also, a clock frequency of FIG. 4A is about twice the clock frequency of FIG. 3, which illustrates progressive scanning. Thus, in FIG. 4A, the start pulse VSP has a high-level period corresponding to at least two clock cycles. Accordingly, the output signal of each flip-flop has a high-level period corresponding to two clock cycles.

The output signal SR1 output from the flip-flop FF1, the output signal SR2 output from the flip-flop FF2, the output signal SR3 output from the flip-flop FF3, . . . , and the output signal SRm output from the flip-flop FF3 are generated through the same process as shown in FIG. 3. Accordingly, the output signals SR1, SR2, SR3, . . . , SRm−1, and SRm of the flip-flops have a high-level period that is delayed by one cycle. Also, since each output signal has a high-level period corresponding to two clock cycles, output signals of two sequential flip-flops have high-level periods that overlap for one clock cycle.

During n cycles of the clock signal CLK, m output signals of the flip-flops are at a high level at intervals of one cycle. Also, during the remaining n+1 cycles of the clock signal CLK, the m output signals of the flip-flops are at a high level at intervals of one cycle.

During the odd field period, the odd line control signal ODD is at a high level. But considering a timing margin, such as a time delay due to a transmission line, during a logical operation on the output signal SR1 of the flip-flop FF1, the odd line control signal ODD may be elevated to a high level half of a clock cycle earlier than the first cycle of the clock signal CLK. In response to the odd line control signal ODD being at a high level, the NAND gates of the odd line selection unit 120 invert the output signals SR1, SR3, . . . , and SRm−1 of the odd-numbered flip-flops and output the inverted signals.

Also, the even line control signal EVEN is at a low level during the odd field period. But considering a timing margin, the even line control signal EVEN may fall to a low level half of a clock cycle later than the first clock cycle of the clock signal CLK. In response to the even line control signal EVEN having a low level, the NAND gates of the even line selection unit 140 mask the output signals of the even numbered flip-flops. Accordingly, the even-numbered scan signals SCAN[2, 4, . . , m] become a high level.

During the even field period, which corresponds to the other half of the frame period, the odd line control signal ODD is at a low level, and the even line control signal EVEN is at a high level. Thus, the output signals of the odd-numbered flip-flops are masked, and the odd line scan signals SCAN[1, 3, . . . , m−1] remain at a high level. Further, the even line selection unit 140 inverts the output signals SR2, SR4, . . . , and SRm of the even-numbered flip-flops and outputs the inverted signals. Accordingly, the even line scan signals SCAN[2, 4 . . . , m] are at a low level during two clock cycles.

Here, the even field period may have one more clock cycle than the odd field period so that the output signal SRm of the final flip-flop is inverted and an intact signal can be transmitted to the mth scan line.

In comparison with FIG. 4A, FIG. 4B shows that the number of clock signals included in an odd field period may equal the number of clock signals included in an even field period. That is, the odd field period of one frame period may have n+1 clock cycles, and the even field period of the frame period may also have n+1 clock cycles. In FIG. 4A, the output signal SRm of the mth flip-flop FFm has a high-level period during the odd field period and the even field period. However, in FIG. 4B, the output signal SRm of the mth flip-flop FFm has a high-level period during two clock cycles included in the odd field period.

The generation of flip-flop output signals and the operations of the odd line selection unit 120 and the even line selection unit 140 are the same as described above with reference to FIG. 4A. Thus, a detailed description thereof will be omitted here.

Embodiment 2

Figure 5A:
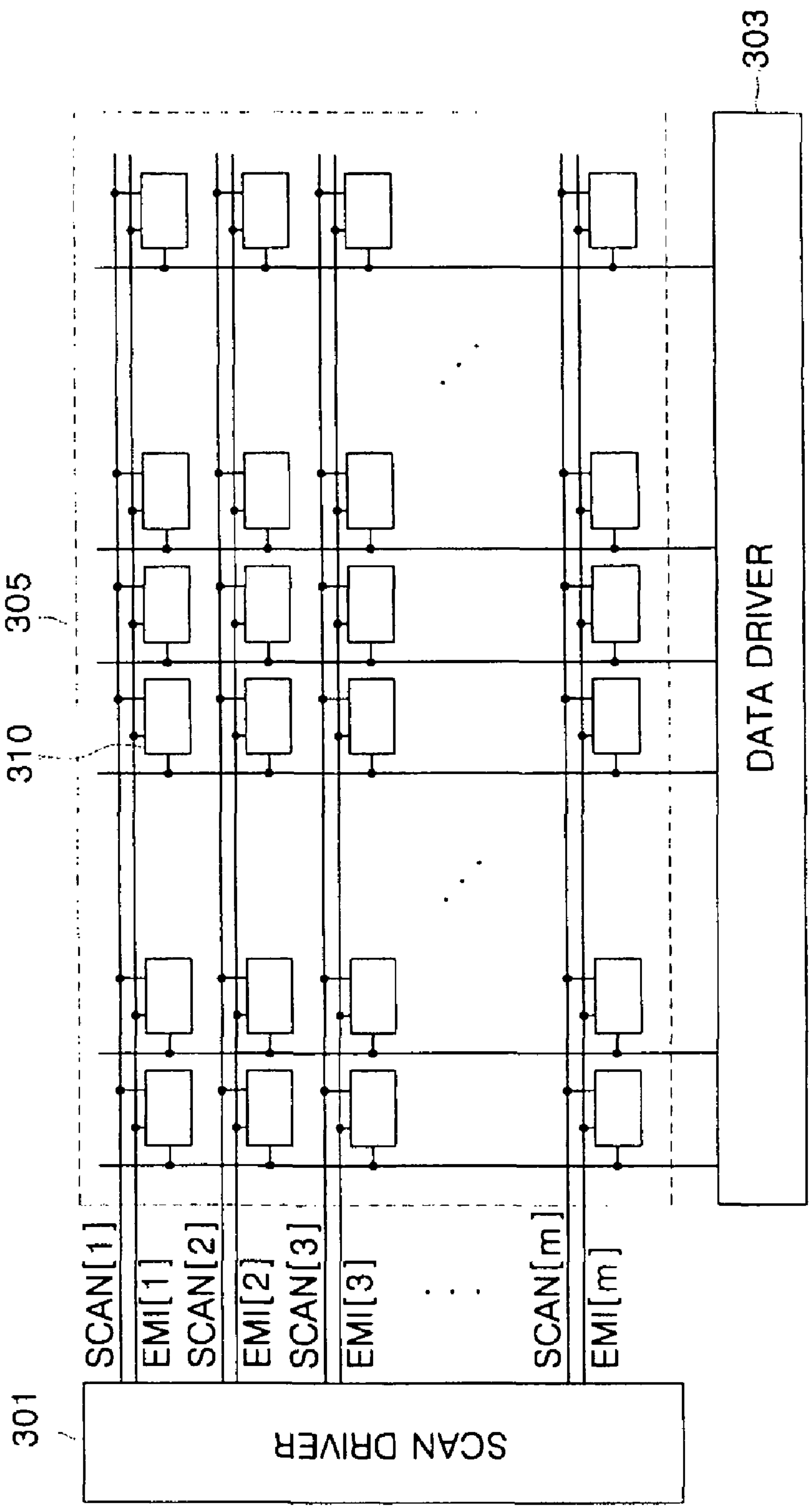
FIG. 5A is a block diagram of an organic EL display including a scan driver according to another exemplary embodiment of the present invention.
Figure 5B:
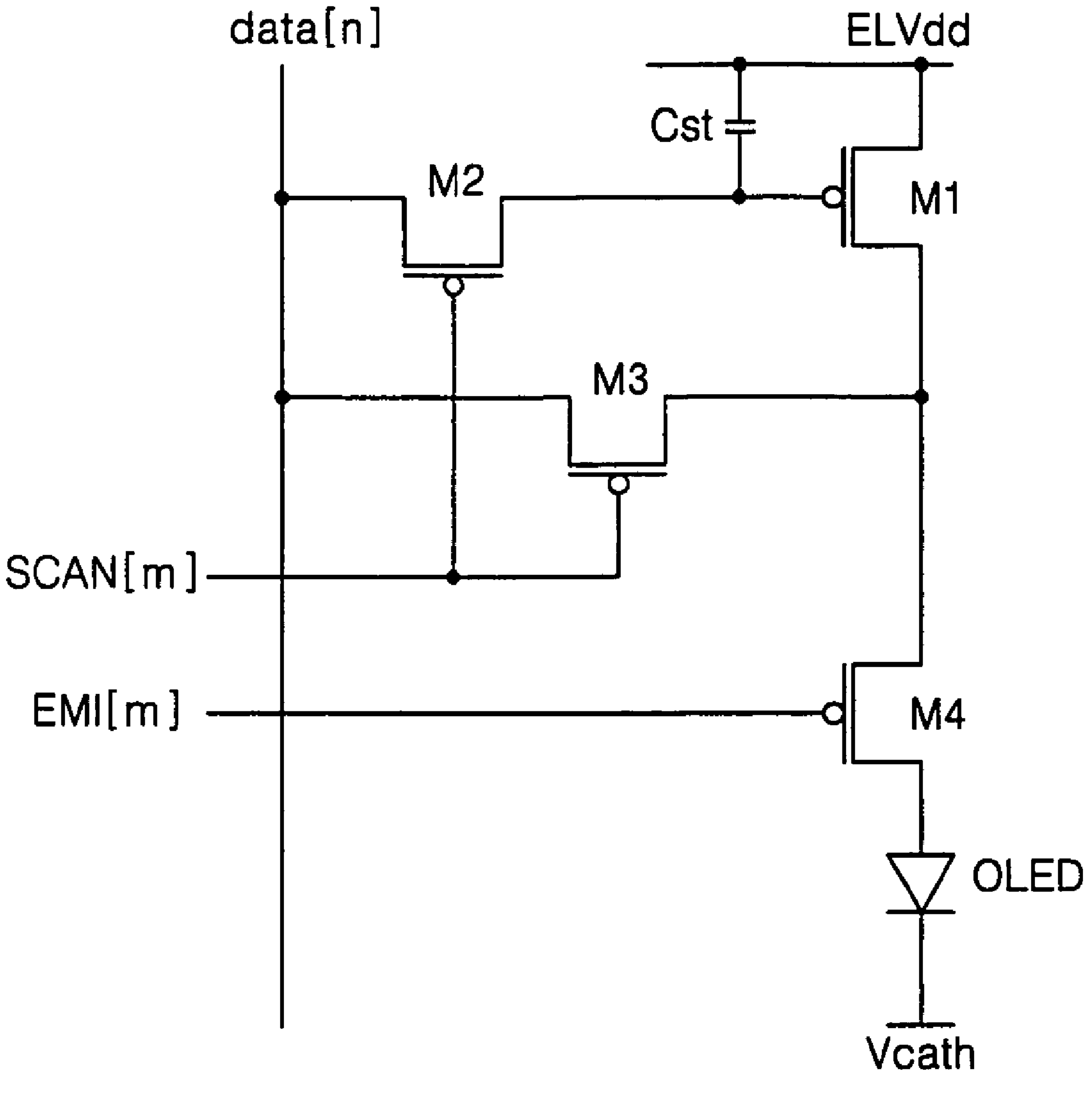
FIG. 5B is a circuit diagram of a pixel driving circuit of the organic EL display of FIG. 5A.

FIG. 5A is a block diagram of an organic electroluminescent (EL) display including a scan driver according to another exemplary embodiment of the present invention, and FIG. 5B is a circuit diagram of a pixel driving circuit of the organic EL display shown in FIG. 5A.

Referring to FIG. 5A, the organic EL display includes a scan driver 301, a data driver 303, and a pixel array 305.

The scan driver 301 selectively performs progressive scanning and interlaced scanning as shown in FIG. 1. The scan driver 301 also applies scan signals via m scan lines and applies emission control signals via m emission control lines.

The data driver 303 applies data to a line of the pixel array 305, which is selected by an emission control signal and a scan signal. The applied data may be a voltage or current. When the applied data is a voltage, the organic EL display may be a voltage-write type, and when the applied data is a current, the organic EL display may be a current-write type.

Although a current-write organic EL display is shown in FIG. 5A, it would be apparent to those skilled in the art that a voltage-write display can be used instead.

The pixel array 305 includes a plurality of pixels 310. A first scan signal SCAN[1] and a first emission control signal EMI[1] are applied to pixels 310 arranged in a first row, and a second scan signal SCAN[2] and a second emission control signal EMI[2] are applied to pixels 310 arranged in a second row. That is, at least one scan signal and at least one emission control signal are applied to pixels 310 arranged in one row that forms one horizontal line.

FIG. 5B is a circuit diagram of a current-write pixel driving circuit of the organic EL display shown in FIG. 5A.

Referring to FIG. 5B, the pixel driving circuit includes four transistors M1, M2, M3, and M4, a program capacitor Cst, and an organic light emitting diode OLED.

A driving transistor M1 supplies substantially the same current as the data current, which is sunk via a data line data[n], to an emission control transistor M4 during an emission operation of a pixel. To generate substantially the same current as the data current, a gate of the driving transistor M1 is electrically connected with a terminal of the program capacitor Cst and a switching transistor M2. The driving transistor M1 is also electrically connected with a power supply voltage ELVdd and transistors M3 and M4.

The switching transistor M2 is turned on in response to a scan signal SCAN[m], thereby forming a path between the data line data[n] and the program capacitor Cst. Also, the switching transistor M2 applies a predetermined bias voltage to the gate of the driving transistor M1, thus forming a voltage Vgs of the driving transistor M1 corresponding to the data current.

The transistor M3 is turned on in response to the scan signal SCAN[m] and supplies a current from the driving transistor M1 to the data line data[n] during a data current program operation.

The transistor M4 is turned on in response to an emission control signal EMI[m] and supplies a current from the driving transistor M1 to the organic light emitting diode OLED during an emission operation.

The current-write pixel driving circuit stores a voltage Vgs corresponding to the data current in the program capacitor Cst and turns on the emission control transistor M4 so that substantially the same current as the data current may be supplied to the organic light emitting diode OLED.

Initially, once the emission control signal EMI[m] makes a low-to-high transition, the emission control transistor M4 is turned off thereby interrupting the emission operation of the organic light emitting diode OLED.

While the emission control transistor M4 is being turned off, when the scan signal SCAN[m] makes a high-to-low transition, both the switching transistor M2 and the transistor M3 are turned on. In response to the low level scan signal SCAN[m], a pixel is selected and starts to program data.

The transistors M2 and M3 are turned on in response to the low level scan signal SCAN[m]. While the transistors M2 and M3 are being turned on, when a data current Idata is sunk via the data line data[n], the power supply voltage ELVdd, the driving transistor M1, and the transistor M3 form a current path. Also, when the data current Idata is sunk, the switching transistor M2 operates in a triode region. That is, direct current is not substantially supplied to the program capacitor Cst and the gate of the driving transistor M1, but only a bias voltage for turning on the driving transistor M1 is applied to the gate of the driving transistor M1.

Also, the driving transistor M1 may operate in a saturation region in order to supply the data current Idata from the power supply voltage ELVdd to the data line data[n]. When the driving transistor M1 operates in the saturation region, the data current Idata, which flows through the driving transistor M1, is given by:

$$Idata=K(Vgs-Vth)^2 \quad (1),$$

where K denotes a proportional constant, Vgs denotes a voltage difference between the gate and source of the driving transistor M1, and Vth denotes a threshold voltage of the driving transistor M1.

When the scan signal SCAN[m] subsequently makes a low-to-high transition, both the transistors M2 and M3 are turned off and the program capacitor Cst maintains the voltage difference Vgs.

Thereafter, when the emission control signal EMI[m] makes a high-to-low transition, the emission control transistor M4 is turned on. As the emission control transistor M4 is turned on, the driving transistor M1 operates in the saturation region, and the data current Idata corresponding to the voltage Vgs stored in the program capacitor Cst is supplied to the transistor M4. A current substantially equal to the data current Idata is supplied to the organic light emitting diode OLED through the emission control transistor M4, thus the organic light emitting diode OLED emits light with luminance corresponding to the data current Idata.

As described above, the current-write pixel driving circuit may have various configurations.

Figure 6A:
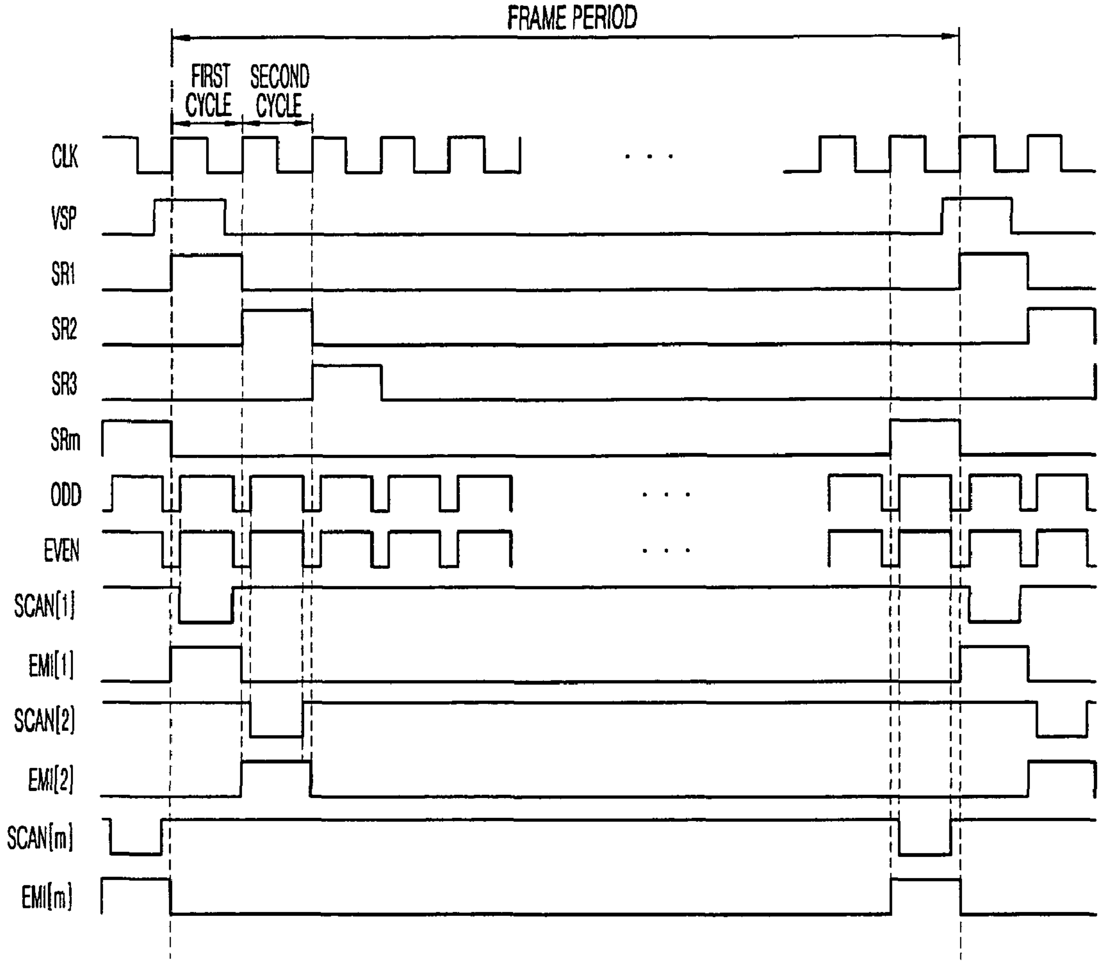
FIG. 6A and FIG. 6B are timing diagrams showing the progressive scanning and interlaced scanning of the organic EL display of FIG. 5A.
Figure 6B:
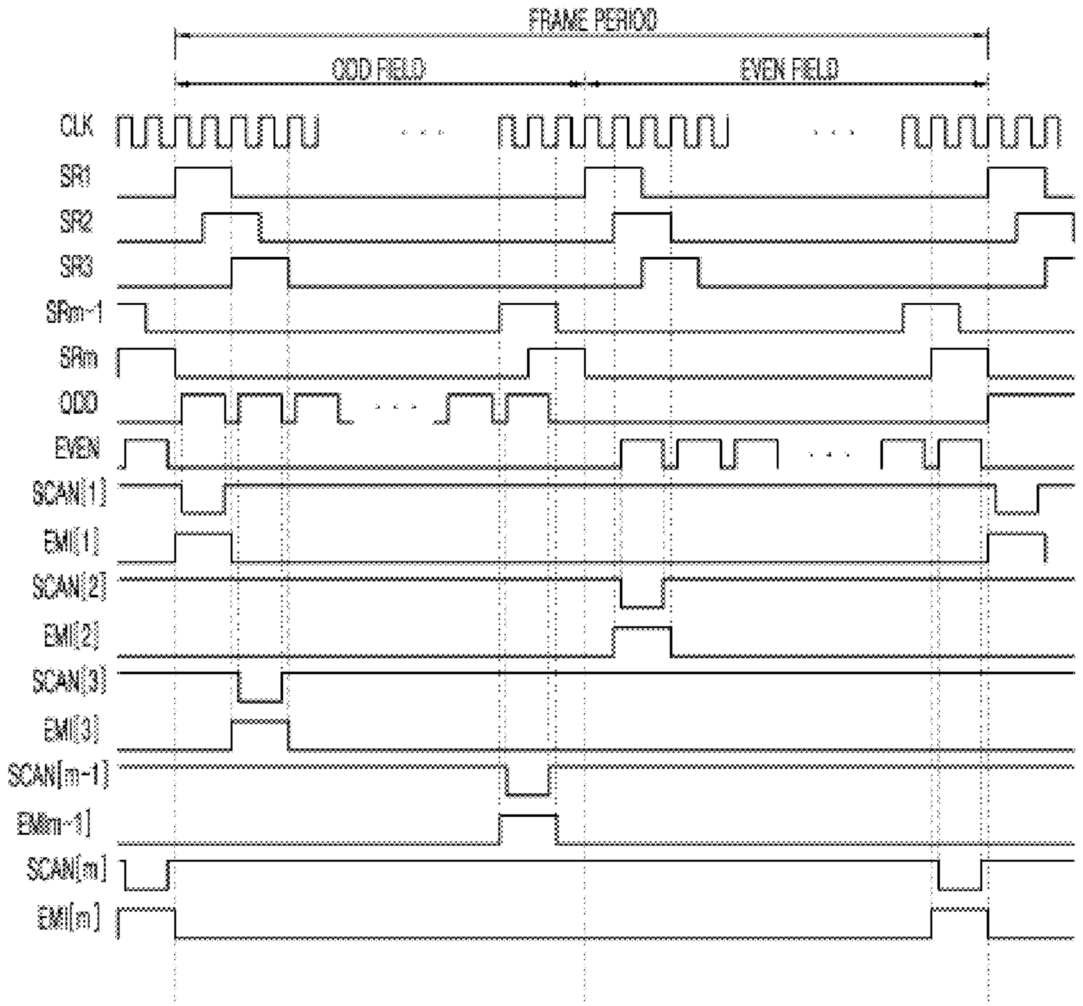

FIG. 6A and FIG. 6B are timing diagrams showing progressive scanning and interlaced scanning of the organic EL display shown in FIG. 5A.

Specifically, FIG. 6A is a timing diagram showing progressive scanning of the organic EL display shown in FIG. 5A.

Referring to FIG. 6A, the organic EL display applies emission control signals EMI[1, 2, . . . , m] to the pixel array 305, thereby enabling the data driver 303 to perform a current-write operation. Also, when an emission control signal EMI [1, 2, . . . , m] is time-synchronized with a scan signal SCAN [1, 2, . . . , m], a pixel may consecutively perform a data current program operation and an emission operation. Therefore, the scan signal SCAN[1, 2, . . . , m] and the emission control signal EMI[1, 2, . . . , m] are applied to the pixel at predetermined time intervals. Accordingly, a low-level period of the scan signal SCAN[1, 2, . . . , m] is shorter than a high-level period of the emission control signal EMI[1, 2, . . . , m].

In order for the scan signal SCAN[1, 2, . . . , m] to be shorter than the emission control signal EMI[1, 2, . . . , m], the odd line control signal ODD and the even line control signal EVEN may be pulse trains.

As can be seen from FIG. 1, when the odd line control signal ODD is at a low level, the output signals SR1, SR3, . . . , and SRm−1 of the odd-numbered flip-flops are masked, and the odd scan signals SCAN[1, 3, . . . , m−1] are at a high level.

Similarly, when the even line control signal EVEN is at a low level, the output signals SR2, SR4, . . . , and SRm of the even-numbered flip-flops are masked, and the even scan signals SCAN[2, 4, . . . , m] are at a high level.

Accordingly, when the odd line control signal ODD is a pulse train, its low-level period is reflected in the odd scan signals SCAN[1, 3, . . . , m−1]. In other words, while the output signal of an odd-numbered flip-flop is at a high level and the odd line control signal ODD is at a low level, the odd scan signal SCAN[1, 3, . . . , m−1] becomes a high level. Accordingly, the odd scan signals SCAN[1, 3, . . . , m−1] of FIG. 6A have shorter low-level time intervals than the odd scan signals of FIG. 3.

Furthermore, as FIG. 6A shows, the high-level period of the odd emission control signals EMI[1, 3, . . . , m−1] is longer than the low-level period of the odd scan signals. Here, the odd emission control signals EMI[1, 3, . . . , m−1] have the substantially same waveform as the output signal of the odd-numbered flip-flops. Hence, the odd emission control signals EMI[1, 3, . . . , m−1] may be formed using the output signals of the odd-numbered flip-flops, or they may be formed using an additional waveform generating circuit according to another embodiment.

The above-described waveform generation process is likewise applied to generate the even scan signals SCAN[2, 4, . . . , m]. Accordingly, the first emission control signal EMI[1] and the first scan signal SCAN[1], the second emission control signal EMI[2] and the second scan signal SCAN [2], . . . , and the mth emission control signal EMI[m] and the m-th scan signal SCAN[m] are sequentially generated in response to the odd line control signal ODD and the even line control signal EVEN.

While the emission control signal EMI[1, 2, . . . , m] is at a high level, a pixel 310 to which it is applied does not emit light. Also, when the scan signal SCAN[1, 2, . . . , m], which has a time interval with the emission control signal EMI[1,

2, . . . , m], is input to the pixel 310, the pixel 310 starts to perform a data current program operation. Once the scan signal SCAN[1, 2, . . . , m] elevates to a high level, the pixel 310 finishes the program operation, and the programmed pixel 310 may then start to emit light from a falling edge of the emission control signal EMI[1, 2, . . . , m], which occurs a short time after the rising edge of the scan signal SCAN[1, 2, . . . , m].

FIG. 6B is a timing diagram showing interlaced scanning of the organic EL display shown in FIG. 5A.

The timing diagram of FIG. 6B may be obtained by adding emission control signals EMI[1, 2, . . . , m] to the timing diagram of FIG. 4B. Further, so that a low-level period of the scan signal SCAN[1, 2, . . . , m] may be shorter than a high-level period of the emission control signal EMI[1, 2, . . . , m], the odd line control signal ODD and the even line control signal EVEN have different waveforms from those shown in FIG. 4B.

During an odd field period, the odd line control signal ODD activates the odd scan signals SCAN[1, 3, . . . , m−1]. But since the odd line control signal ODD has a low-level period during each cycle of the clock signal CLK, output signals of odd-numbered flip-flops are masked during the low-level period. Accordingly, as described above with reference to FIG. 6A, a high-level period of the emission control signals is longer than a low-level period of the scan signals.

Since an emission control signal has the substantially same waveform as the output signal of a flip-flop, the output signals of the flip-flops can be used as the emission control signals. Alternatively, an additional circuit may be added to generate the emission control signals.

During an even field period, the even line control signal EVEN activates even scan signals SCAN[2, 4, . . . , m]. Since the even line control signal EVEN has a low-level period during each cycle of the clock signal CLK, the output signal of the even-numbered flip-flop is masked and output as a high-level signal during the low-level period.

As described above, it can be seen that progressive scanning or interlaced scanning may be carried out using the odd line control signal ODD and the even line control signal EVEN. In other words, the scan driver may selectively perform progressive scanning and interlaced scanning in response to the odd line control signal ODD and the even line control signal EVEN. Consequently, a display including the scan driver, such as an organic EL display, an LCD, or a PDP, can selectively perform progressive scanning and interlaced scanning.

Embodiment 3

Figure 7:
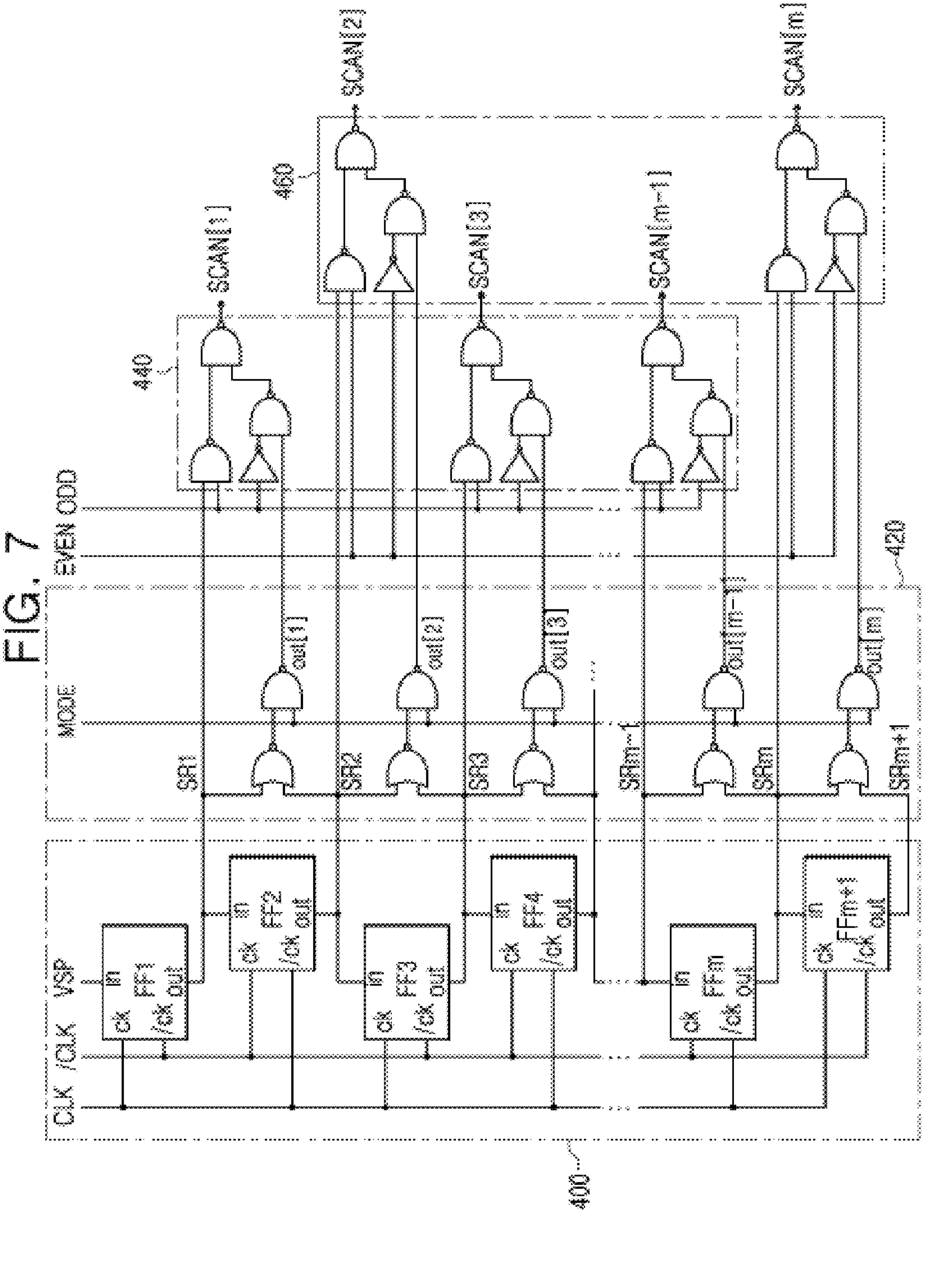
FIG. 7 is a circuit diagram of a scan driver according to still another exemplary embodiment of the present invention.

FIG. 7 is a circuit diagram of a scan driver according to still another exemplary embodiment of the present invention.

Referring to FIG. 7, the scan driver includes a shift register 400, a mode selection unit 420, an odd line selection unit 440, and an even line selection unit 460.

The shift register 400 includes a plurality of flip-flops, and there are more flip-flops than scan lines of a panel. Thus, when the panel includes m scan lines, the shift register 400 includes at least m+1 flip-flops. At least one of clock signal CLK and an inverted clock signal /CLK is input to each flip-flop.

A first flip-flop FF1 receives a start pulse VSP, and the clock signal CLK is input to a clock input pin CK. The first flip-flop FF1 samples data of the start pulse VSP and outputs the sampled data on a rising edge of the clock signal CLK.

A second flip-flop FF2 receives an output signal SR1 of the first flip-flop FF1, and the inverted signal /CLK of the clock signal CLK is input to a clock input pin CK of the second flip-flop FF2. The second flip-flop FF2 samples the output signal SR1 and outputs the sampled signal on a falling edge of the clock signal CLK.

That is, odd-numbered flip-flops FF1, FF3, . . . , FFm−1, and FFm+1 sample an input signal and output the sampled signal on a rising edge of the clock signal CLK and store data, which is input directly before a falling edge of the clock signal CLK, in a low-level period of the clock signal CLK. Also, even-numbered flip-flops FF2, FF4, . . . , and FFm sample an input signal and output the sampled signal on a falling edge of the clock signal CLK and store data, which is input directly before a rising edge of the clock signal CLK, in a high-level period of the clock signal CLK.

The mode selection unit 420 includes a plurality of mode selection circuits that are arranged in parallel. Each mode selection circuit receives output signals of two serial flip-flops and performs a logical operation on the received output signals in response to a mode selection signal MODE. Each mode selection circuit includes a NOR gate to receive the output signals of the two serial flip-flops and a NAND gate to receive the NOR gate's output signal and the mode selection signal MODE.

The odd line selection unit 440 provides odd line scan signals SCAN[1, 3, . . . , m−1] to odd-numbered scan lines according to an operation determined by the mode selection unit 420. The odd line selection unit 440 includes a plurality of line selection circuits that select the output signal of the flip-flop or an output signal of the mode selection circuit according to control of the odd line control signal ODD.

The even line selection unit 460 provides even line scan signals SCAN[2, 4, . . . , m] to even-numbered scan lines according to an operation determined by the mode selection unit 420. The even line selection unit 460 includes a plurality of line selection circuits that select the output signal of the flip-flop or the output signal of the mode selection circuit according to control of the even line control signal EVEN.

Figure 8:
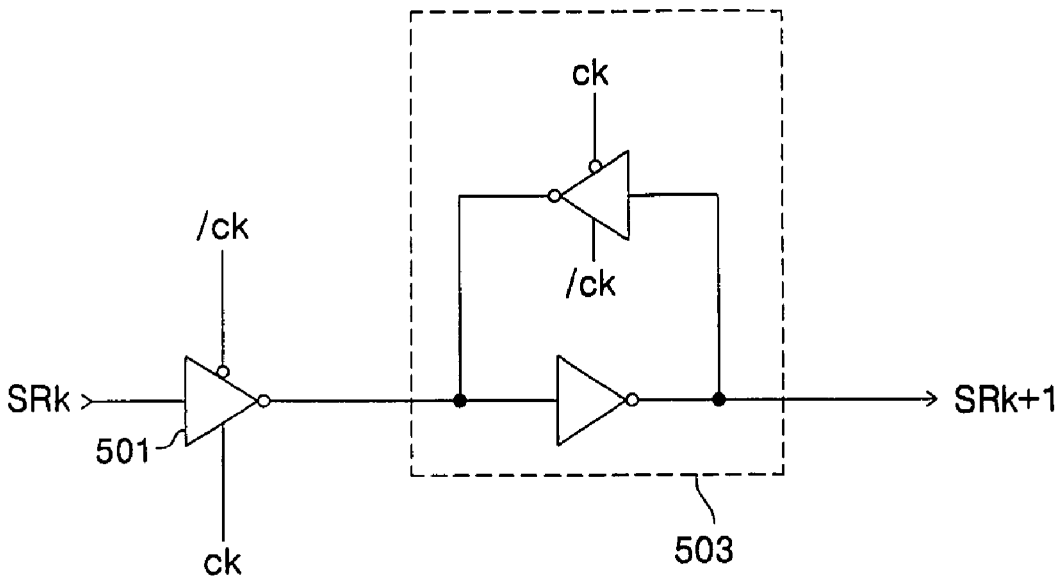
FIG. 8 is a circuit diagram of a flip-flop of FIG. 7.

FIG. 8 is a circuit diagram of one of the flip-flops of FIG. 7.

Referring to FIG. 8, the flip-flop includes a sampler 501 and a holder 503. With an odd numbered flip-flop, the sampler 501 samples an input signal SRk, or the start pulse VSP in the case of the first flip-flop FF1, during a high-level period of an input clock signal CLK, and the holder 503 outputs the input signal SRk during a high-level period of the clock signal CLK and holds the input signal SRk during a low-level period thereof.

The sampler 501 may include an inverter that operates in response to the clock signal CLK. Thus, the sampler 501 samples the input signal SRk during a high-level period of the clock signal CLK. While the clock signal CLK remains at a high level, the input signal SRk is input to the flip-flop and output. Once the clock signal CLK falls to a low level, the sampler 501 interrupts the input of the input signal SRk, which is simultaneously held in the holder 503. The holder 503 starts to hold the input signal SRk on a falling edge of the clock signal CLK. Thus, with an odd numbered flip-flop, the flip-flop receives the input signal SRk and outputs the received input signal SRk during a high-level period of the clock signal CLK and holds the input signal SRk, which is input directly before a falling edge of the clock signal CLK, and outputs the held input signal SRk during a low-level period thereof.

Figures 9A, 9B:
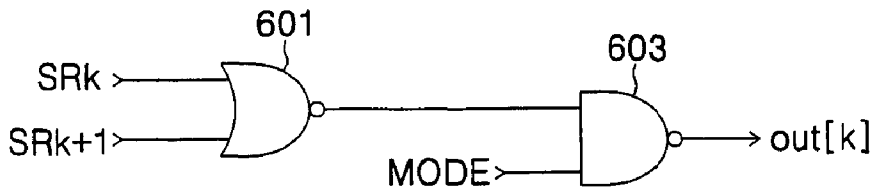
FIG. 9A and FIG. 9B are a circuit diagram and a truth table, respectively, of a mode selection circuit of FIG. 7.

FIG. 9A and FIG. 9B are a circuit diagram and a truth table, respectively, of a mode selection circuit of FIG. 7.

Referring to FIG. 9A, the mode selection circuit includes a NOR gate 601 and a NAND gate 603. The NOR gate 601 receives an output signal SRk of a kth flip-flop and an output signal SRk+1 of a (k+1)th flip-flop.

The NAND gate 603 receives the output signal of the NOR gate 601 and the mode selection signal MODE and performs a NAND operation on the two input signals and then inputs the operation result out[k] to the line selection circuit.

FIG. 9B shows a logic state of the mode selection signal MODE and a state of the operation result out[k] that is obtained from the NAND operation.

When the mode selection signal MODE is at a low level, the NAND gate 603 outputs a high-level signal irrespective of the output of the NOR gate 601.

On the other hand, when the mode selection signal MODE is at a high level, the NAND gate 603 inverts the output of the NOR gate 601. Accordingly, when the input signals SRk and SRk+1 are at a low level, the result out[k] is also a low level. In all other cases, the result out[k] is a high level. Hence, during progressive scanning (i.e. when the mode selection signal MODE is at a high level), the mode selection unit performs a logical OR operation on the output signals SRk and SRk+1.

Accordingly, the mode selection circuit outputs a low-level signal only when the mode selection signal MODE is at a high level and the input signals SRk and SRk+1 are at a low level.

Figure 10:
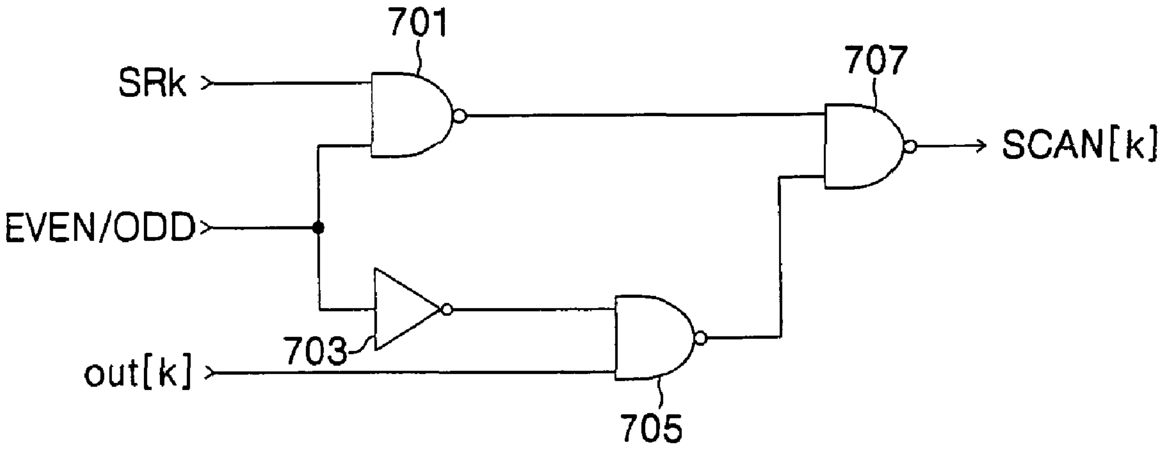
FIG. 10 is a circuit diagram of a line selection circuit of FIG. 7.

FIG. 10 is a circuit diagram of a line selection circuit of FIG. 7.

Referring to FIG. 10, the line selection circuit includes three NAND gates 701, 705, and 707 and an inverter 703. The line selection circuit selects either the output signal SRk of the flip-flop or the output signal out[k] of the mode selection circuit in response to the odd line control signal ODD or the even line control signal EVEN. For example, when a high level odd line control signal ODD is input to the line selection circuit, the first NAND gate 701 inverts the output signal SRk of the flip-flop. Also, since the inverter 703 outputs a low-level signal to the second NAND gate 705, the second NAND gate 705 outputs a high-level signal irrespective of the level of the output signal out[k] of the mode selection circuit. Since the high-level output signal of the second NAND gate 705 is input to the third NAND gate 707, the third NAND gate 707 inverts the output signal of the first NAND gate 701. Thus, an output signal SCAN[k] of the third NAND gate 707 becomes the output signal SRk of the flip-flop.

On the other hand, when a low level odd line control signal ODD is input to the line selection circuit, the first NAND gate 701 outputs a high-level signal irrespective of the level of the output signal SRk of the flip-flop. Also, since the inverter 703 outputs a high-level signal to the second NAND gate 705, the second NAND gate 705 inverts the output signal out[k] of the mode selection circuit and outputs the result to the third NAND gate 707. Since the third NAND gate 707 receives the high-level output signal of the first NAND gate 701, it inverts the output signal of the second NAND gate 705. Accordingly, the output signal SCAN[k] of the third NAND gate 707 becomes the output signal out[k] of the mode selection circuit.

In other words, the line selection circuit of FIG. 10 selects and outputs the output signal SRk of the flip-flop when the odd line control signal ODD or the even line control signal EVEN are at a high level, and selects and outputs the output signal out[k] of the mode selection circuit when the odd line control signal ODD or the even line control signal EVEN are at a low level.

Figure 11A:
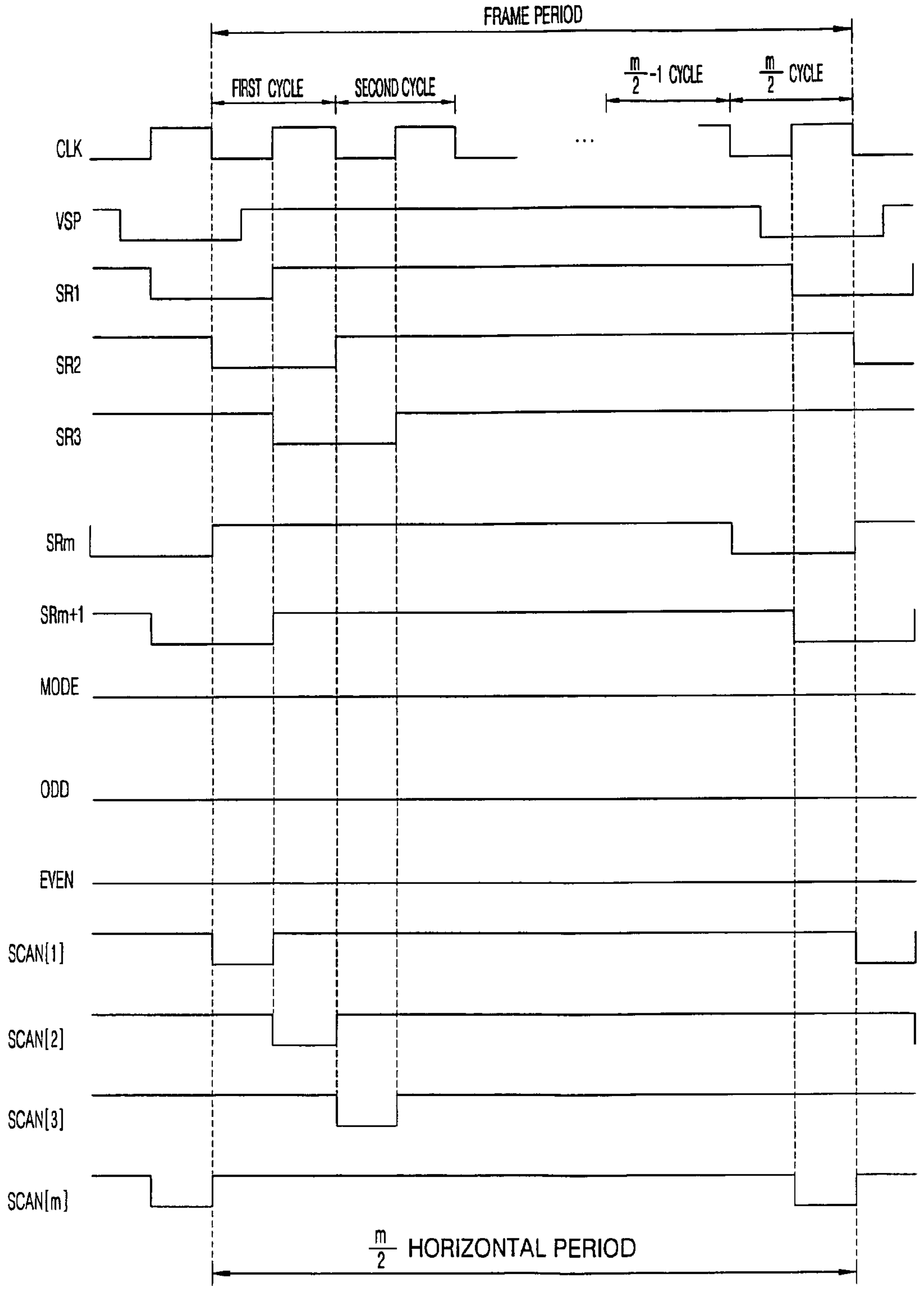
FIG. 11A and FIG. 11B are timing diagrams showing the progressive scanning and interlaced scanning of the scan driver of FIG. 7.
Figure 11B:
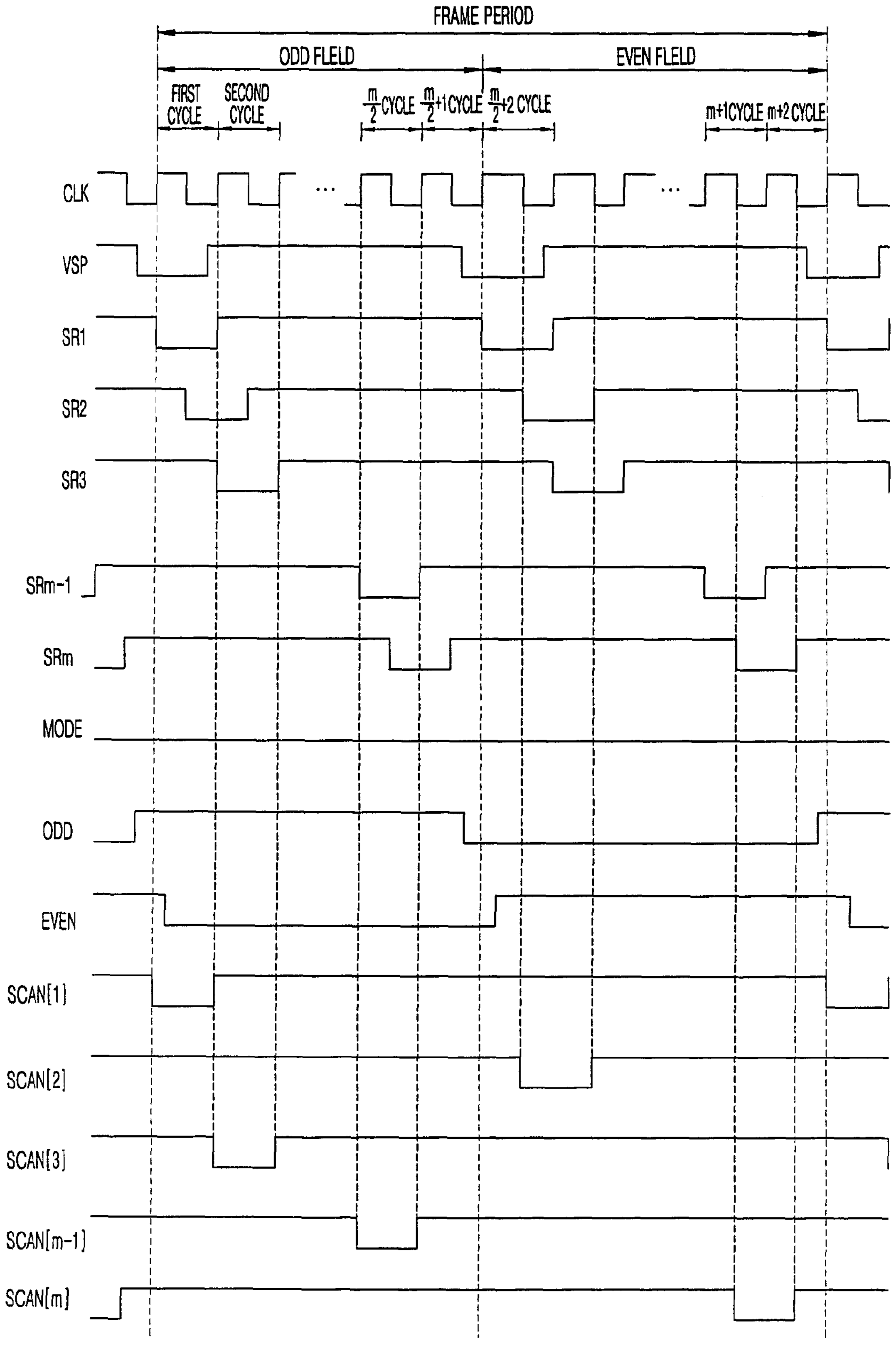

FIG. 11A and FIG. 11B are timing diagrams showing progressive scanning and interlaced scanning, respectively, of the scan driver of FIG. 7.

Referring to FIG. 7 and FIG. 11A, during progressive scanning, the scan driver sequentially activates m scan signals during one frame period.

Initially, a start pulse VSP, which has the same frequency as a vertical synchronous signal that defines an image frame display period, is input to an input terminal of the first flip-flop FF1. The first flip-flop FF1 samples the input signal on a rising edge of the clock signal CLK. Thus, an output signal SR1 of the first flip-flop FF1 makes a high-to-low transition on a rising edge of a final cycle of the previous frame. Also, since the start pulse VSP is at a high level when it is sampled on the rising edge of the clock signal CLK in the first cycle of the present frame, the output signal SR1 of the first flip-flop FF1 makes a low-to-high transition. Accordingly, the output signal SR1 remains at a low level from a high-level period of the final cycle of the previous frame to a low-level period of a first cycle of the present frame of the clock signal CLK.

The output signal SR1 of the first flip-flop FF1 is input to the second flip-flop FF2, and an inverted clock signal /CLK is input to a clock input terminal CK of the second flip-flop FF2. Thus, the second flip-flop FF2 samples the output signal SR1 of the first flip-flop FF1 on a falling edge of the clock signal CLK. As a result, an output signal SR2 of the second flip-flop FF2 makes a high-to-low transition on a falling edge of the first cycle of the clock signal CLK and then makes a low-to-high transition on a falling edge of a second cycle thereof.

In a similar process to the above-described process, an output signal SR3 of the third flip-flop FF3 makes a high-to-low transition on a rising edge of a first cycle of the clock signal CLK and makes a low-to-high transition on a rising edge of a second cycle of the clock signal.

Also, an output signal SRm of the mth flip-flop FFm makes a high-to-low transition on a falling edge of an m/2th cycle of the clock signal CLK and makes a low-to-high transition on a falling edge of a first cycle of the next frame.

Further, an output signal SRm+1 of the (m+1)th flip-flop makes a high-to-low transition on a rising edge of the m/2th cycle of the clock signal CLK and makes a low-to-high transition on a rising edge of the first cycle of the next frame.

When the scan driver performs progressive scanning, the mode selection signal MODE is set to a high level. In this case, as shown in FIG. 9A and FIG. 9B, the mode selection circuits of the mode selection unit 420 output a low-level signal only when the output signals SRk and SRk+1 of sequential flip-flops are at a low level.

Also, the odd line control signal ODD and the even line control signal EVEN are set to a low level. Since the odd line control signal ODD is at a low level, the line selection circuit of the odd line selection unit 440 selects an output signal out[1, 3, . . . , m+1] of an odd mode selection circuit and outputs the output signal out[1, 3, . . . , m+1] to a corresponding scan line.

Furthermore, since the even line control signal EVEN is at a low level, the line selection circuit of the even line selection unit 460 selects an output signal out[2, 4, . . . , m] of an even mode selection circuit and outputs the output signal out[2, 4, . . . , m] to a corresponding scan line.

As described above, the mode selection circuit outputs a low level signal only when the output signals of sequential flip-flops are at a low level. Therefore, a first scan signal SCAN[1] is at a low level only when both the output signal SR1 of the first flip-flop FF1 and the output signal SR2 of the second flip-flop FF2 are at a low level. Accordingly, the first scan signal SCAN[1] is activated during a low-level period of the first cycle of the clock signal CLK.

A second scan signal SCAN[2] is at a low level only when both the output signal SR2 of the second flip-flop FF2 and an output signal SR3 of the third flip-flop FF3 are at a low level. Accordingly, the second scan signal SCAN[2] is activated during a high-level period of the first cycle of the clock signal CLK. Also, a third scan signal SCAN[3] is activated during a low-level period of the second cycle of the clock signal CLK.

In the above-described process, m scan signals may be sequentially activated during each frame period. Thus, the respective scan signals are sequentially transmitted with a phase difference of half of the cycle of the clock signal CLK to the scan lines during progressive scanning.

Referring to FIG. 11B, the mode selection signal MODE is at a low level to perform interlaced scanning. Thus, the mode selection circuit of FIG. 9A outputs a high-level signal irrespective of the output signals of sequential flip-flops. Accordingly, all mode selection circuits output high level output signals out[1, 2, . . . , m].

Also, output signals SR2, SR4, . . . , and SRm of even-numbered flip-flops are masked during an odd field period in which odd scan lines are scanned. Similarly, output signals SR1, SR3, . . . , and SRm−1 of odd-numbered flip-flops are masked during an even field period in which even scan lines are scanned.

A low level even line control signal EVEN masks the output signals SR2, SR4, . . . , and SRm of the even-numbered flip-flops during the odd field period. During interlaced scanning, the mode selection signal MODE is at a low level so that all output signals out[1, 2, . . . , m] of the mode selection circuit are at a high level. Also, since the even line control signal EVEN is at a low level, the line selection circuit of the even line selection unit 460 selects the output signal out[2, 4, . . . , m] of the even-numbered flip-flop. Accordingly, the even scan signal SCAN[2, 4, . . . , m] is a high-level signal. That is, in response to the low level even line control signal EVEN, the output signals SR2, SR4, . . . , and SRm of the even-numbered flip-flops are not selected by the line selection circuit. Rather, they are masked to a high level.

During the odd field period, the odd line control signal ODD is at a high level. The line selection circuit of the odd line selection unit 440 selects the output signals SR1, SR3, . . . , and SRm−1 of the odd-numbered flip-flop in response to the high level odd line control signal ODD. Thus, the odd scan signals SCAN[1, 3, . . . , m−1] are sequentially output at a low level in response to the clock signal CLK.

In other words, the first scan signal SCAN[1] is at a low level during a first cycle of the clock signal CLK, and the third scan signal SCAN[3] is at a low level during a second cycle thereof. Also, the (m−1)th scan signal SCAN[m−1] is at a low level during an m/2th cycle of the clock signal CLK.

During the even field period, a low level odd line control signal ODD masks the output signals SR1, SR3, . . . , and SRm−1 of the odd-numbered flip-flops. In the case of interlaced scanning, the mode selection signal MODE is at a low level so that all output signals out[1, 2, . . . , m] of the mode selection circuit are at a high level. Also, since the odd line control signal ODD is at a low level, the line selection circuit of the odd line selection unit 440 selects the output signal out[1, 3, . . . , m−1]. Accordingly, the odd scan signal SCAN [1, 3, . . . , m−1] is a high-level signal. That is, in response to the low level odd line control signal ODD, the output signals SR1, SR3, . . . , and SRm−1 of the odd-numbered flip-flops are not selected by the line selection circuit. Rather, they are masked to a high level.

Furthermore, during the even field period, the even line control signal EVEN is at a high level. The line selection circuit of the even line selection unit 460 selects the output signal SR2, SR4, . . . , and SRm of the even-numbered flip-flop in response to the high level even line control signal EVEN. Thus, the even scan signals SCAN[2, 4, . . . , m] are sequentially output at a low level in response to the clock signal CLK.

That is, the second scan signal SCAN[2] is at a low level in a low-level period of an (m/2+2)th cycle of the clock signal CLK and in a high-level period of a (m/2+3)th cycle thereof, and the fourth scan signal SCAN[4] is at a low level in a low-level period of the (m/2+3)th cycle of the clock signal and in a high-level period of an (m/2+4)th cycle thereof. Also, the mth scan signal SCAN[m] is at a low level in a low-level period of an (m+1)th cycle of the clock signal CLK and in a high-level period of an (m+2)th cycle thereof. Hence, during the even field period, the output signals SR1, SR3, . . . , and SRm−1 of the odd-numbered flip-flops are masked to a high level, and the output signals SR2, SR4, . . . , and SRm of the even-numbered flip-flops are selected by the line selection circuit and output as scan signals.

In the above-described process, when the scan driver performs interlaced scanning, the odd scan signals SCAN[1, 3, . . . , m−1] are sequentially formed by a combination of the mode selection signal MODE and the odd line control signal ODD and transmitted to the respective odd scan lines during the odd field period.

During the odd field period, the even scan signal SCAN[2, 4, . . . , m] is masked and output in response to the even line control signal EVEN. Hence, during the odd field period, the even scan signal SCAN[2, 4, . . . , m] has no data required for a scan operation and is set at a high level.

On the other hand, during the even field period, the even scan signals SCAN[2, 4, . . . , m] are sequentially formed by a combination of the mode selection signal MODE and the even line control signal EVEN and transmitted to the respective even scan lines.

Additionally, the odd scan signal SCAN[1, 3, . . . , m−1] is masked and output in response to the odd line control signal ODD. Hence, during the even field period, the odd scan signal SCAN[1, 3, . . . . , m−1] has no data required for a scan operation and is set at a high level.

As described above, progressive scanning and interlaced scanning can be selectively performed using the mode selection signal MODE, the odd line control signal ODD, and the even line control signal EVEN.

According to exemplary embodiments of the present invention described above, progressive scanning and interlaced scanning can be selectively performed according to the levels of an odd line control signal and an even line control signal.

Further, an output signal of a shift register can be generated as a scan signal required for progressive scanning or interlaced scanning using the mode selection signal, the odd line control signal, and the even line control signal. Therefore, one scan driver may be used to selectively enable progressive scanning and interlaced scanning.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A scan driver that selectively performs progressive scanning and interlaced scanning, comprising:

a shift register for receiving a start pulse and a clock signal and outputting data at intervals of half of a cycle of the clock signal;

a mode selection unit for receiving an output signal of a flip-flop of the shift register and performing a logical operation on the output signal of the flip-flop in response to a mode selection signal;

an odd line selection unit for selecting an output signal of an odd-numbered flip-flop or an output signal of the mode selection unit in response to an odd line control signal; and an even line selection unit for selecting an output signal of an even-numbered flip-flop or the output signal of the mode selection unit in response to an even line control signal.

2. The scan driver of claim 1, wherein:

the shift register comprises a plurality of flip-flops that are connected in series;

odd-numbered flip-flops of the shift register sample an input signal and output the sampled input signal on a rising edge of the clock signal; and even-numbered flip-flops of the shift register sample an input signal and output the sampled input signal on a falling edge of the clock signal.

3. The scan driver of claim 2, wherein each odd-numbered flip-flop comprises:

a first sampler for sampling the input signal in a high-level period of the clock signal; and a first holder for holding an output signal of the first sampler in a low-level period of the clock signal.

4. The scan driver of claim 3, wherein each even-numbered flip-flop comprises:

a second sampler for sampling the input signal in a low-level period of the clock signal; and a second holder for holding an output signal of the second sampler in a high-level period of the clock signal.

5. The scan driver of claim 1, wherein the mode selection unit comprises:

a NOR gate for receiving the output signal of the odd-numbered flip-flop and the output signal of the even-numbered flip-flop, the even-numbered flip-flop being adjacent to the odd-numbered flip-flop; and a NAND gate for receiving an output signal of the NOR gate and the mode selection signal.

6. The scan driver of claim 5, wherein the mode selection unit performs a logical OR operation on the output signal of the odd-numbered flip-flop and the output signal of the even-numbered flip-flop during the progressive scanning, and the mode selection unit masks the output signal of the odd-numbered flip-flop and the output signal of the even-numbered flip-flop by outputting a high-level signal during the interlaced scanning.

7. The scan driver of claim 1, wherein the odd line selection unit comprises:

a first NAND gate for receiving the output signal of the odd-numbered flip-flop and the odd line control signal;

a second NAND gate for receiving the output signal of the mode selection unit corresponding to the mode selection signal and the output signal of the odd-numbered flip-flop and an inverted signal of the odd line control signal; and a third NAND gate for receiving an output signal of the first NAND gate and an output signal of the second NAND gate.

8. The scan driver of claim 7, wherein when the odd line control signal is at a high level, the odd line selection unit selects the output signal of the odd-numbered flip-flop, and when the odd line control signal is at a low level, the odd line selection unit selects the output signal of the mode selection unit corresponding to the mode selection signal and the output signal of the odd-numbered flip-flop.

9. The scan driver of claim 8, wherein the even line selection unit includes:

a fourth NAND gate for receiving the output signal of the even-numbered flip-flop and the even line control signal;

a fifth NAND gate for receiving the output signal of the mode selection unit corresponding to the mode selection signal and the output signal of the even-numbered flip-flop and an inverted signal of the even line control signal; and a sixth NAND gate for receiving an output signal of the fourth NAND gate and an output signal of the fifth NAND gate.

10. The scan driver of claim 9, wherein when the even line control signal is at a high level, the even line selection unit selects the output signal of the even-numbered flip-flop, and when the even line control signal is at a low level, the even line selection unit selects the output signal of the mode selection unit corresponding to the mode selection signal and the output signal of the even-numbered flip-flop.

11. A scan driver that selectively performs progressive scanning and interlaced scanning, comprising:

a shift register including a plurality of flip-flops connected in series, wherein odd-numbered flip-flops sample an input signal and output the sampled signal on a rising edge of a clock signal, and even-numbered flip-flops sample an input signal and output the sampled signal on a falling edge of the clock signal;

a mode selection unit for performing a logical OR operation on output signals of adjacent flip-flops or masking the output signals of the flip-flops in response to a mode selection signal;

an odd line selection unit for selecting an output signal of an odd-numbered flip-flop or an output signal of the mode selection unit in response to an odd line control signal; and an even line selection unit for selecting an output signal of an even-numbered flip-flop or the output signal of the mode selection unit in response to an even line control signal.

12. The scan driver of claim 11, wherein each odd-numbered flip-flop comprises:

a first sampler for sampling the input signal in a high-level period of the clock signal; and a first holder for holding an output signal of the first sampler in a low-level period of the clock signal.

13. The scan driver of claim 12, wherein each even-numbered flip-flop comprises:

a second sampler for sampling the input signal in a low-level period of the clock signal; and a second holder for holding an output signal of the second sampler in a high-level period of the clock signal.

14. The scan driver of claim 11, wherein the mode selection unit performs the logical OR operation on the output signals of the adjacent flip-flops when the mode selection signal requires the progressive scanning and masks the output signals of the flip-flops when the mode selection signal requires the interlaced scanning.

15. The scan driver of claim 14, wherein during the progressive scanning, each of the odd line selection unit and the even line selection unit selects a result of the logical OR operation of the mode selection unit.

16. The scan driver of claim 14, wherein during the interlaced scanning, the odd line selection unit selects the output signal of the odd-numbered flip-flop during an odd field period corresponding to half of a frame period and the even line selection unit selects the masked output signal of the mode selection unit.

17. The scan driver of claim 16, wherein during an even field period corresponding to the remaining half of the frame period, the odd line selection unit selects the masked output signal of the mode selection unit and the even line selection unit selects the output signal of the even-numbered flip-flop.

* * * * *